(12) United States Patent
Komatsu

(10) Patent No.: US 11,318,353 B2
(45) Date of Patent: May 3, 2022

(54) GOLF BALL

(71) Applicant: Bridgestone Sports Co., Ltd., Tokyo (JP)

(72) Inventor: Atsushi Komatsu, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 16/722,978

(22) Filed: Dec. 20, 2019

(65) Prior Publication Data

US 2020/0206572 A1 Jul. 2, 2020

(30) Foreign Application Priority Data

Dec. 27, 2018 (JP) .............................. JP2018-245206

(51) Int. Cl.
| | | |
|---|---|---|
| *A63B 37/06* | (2006.01) | |
| *A63B 37/00* | (2006.01) | |
| *C08L 9/06* | (2006.01) | |
| *C08L 9/00* | (2006.01) | |
| *C08L 33/02* | (2006.01) | |

(52) U.S. Cl.
CPC ...... *A63B 37/0024* (2013.01); *A63B 37/0031* (2013.01); *A63B 37/0033* (2013.01); *A63B 37/0043* (2013.01); *A63B 37/0045* (2013.01); *A63B 37/0075* (2013.01); *C08L 9/00* (2013.01); *C08L 9/06* (2013.01); *C08L 33/02* (2013.01); *A63B 37/0096* (2013.01)

(58) Field of Classification Search
CPC .................................................. A63B 37/0024
USPC .......................................................... 473/378
See application file for complete search history.

(56) References Cited

U.S. PATENT DOCUMENTS

| | | | |
|---|---|---|---|
| 6,361,455 B1 * | 3/2002 | Takemura .......... | A63B 37/0003 473/351 |
| 8,784,236 B2 * | 7/2014 | Sullivan ............. | A63B 37/0039 473/373 |
| 2003/0158340 A1 * | 8/2003 | Iwami ....................... | C08L 9/00 525/184 |
| 2005/0056964 A1 * | 3/2005 | Hiraoka .................. | B29C 43/18 264/254 |
| 2013/0157784 A1 * | 6/2013 | Komatsu ............ | A63B 37/0033 473/378 |

FOREIGN PATENT DOCUMENTS

| | | |
|---|---|---|
| JP | 2001-070478 A | 3/2001 |
| JP | 2006-212116 A | 8/2006 |

\* cited by examiner

*Primary Examiner* — Raeann Gorden
(74) *Attorney, Agent, or Firm* — Sughrue Mion, PLLC

(57) ABSTRACT

In a golf ball having a core, a cover and at least one intermediate layer therebetween, the cover is formed of a rubber composition which includes a diene rubber, methacrylic acid, a metal oxide and an organic peroxide. The cover has a specific Poisson's ratio, Shore D hardness and thickness. At least one intermediate layer has a specific Shore D hardness and thickness. This golf ball, even with the use of a rubber cover, compares favorably with balls having conventional resin covers, both in that it can achieve a lower spin rate on shots with a driver (W #1) and thus has an excellent flight performance and also in that it can improve controllability in the short game.

6 Claims, No Drawings

GOLF BALL

CROSS-REFERENCE TO RELATED APPLICATION

This non-provisional application claims priority under 35 U.S.C. § 119(a) on Patent Application No. 2018-245206 filed in Japan on Dec. 27, 2018, the entire contents of which are hereby incorporated by reference.

TECHNICAL FIELD

The present invention relates to a multi-piece solid golf ball with a construction of three or more layers that has a core, a cover and at least one intermediate layer interposed therebetween.

BACKGROUND ART

Generally, the cover serving as the outermost layer of a golf ball is made primarily of a synthetic resin material such as an ionomer or a polyurethane resin. Among the golf balls that have been described to date in the art are several in which the scuff resistance or durability of the ball is improved by using a rubber cover. Prior art relating to rubber covers is described in, for example, JP-A 2001-70478 and JP-A 2006-212116.

However, such golf balls have a higher spin rate on shots with a driver and are often unable to achieve the desired distance. Moreover, in such golf balls, a rubber material is used in the cover, and so the production efficiency is inferior to that for golf balls having resin covers. Also, in the hardness design of the golf ball cover, when endeavoring to lower the spin rate on shots with a driver, there is a risk of an accompanying decrease in the spin rate in the short game, but the desire is that the spin rate on approach shots be kept high.

SUMMARY OF THE INVENTION

It is therefore an object of the present invention to provide a golf ball which, even with the use of a rubber cover, compares favorably with balls having conventional resin covers in that it can achieve a lower spin rate on shots with a driver (W #1) and thus has an excellent flight performance and also in that it can improve controllability in the short game.

As a result of extensive investigations, I have discovered that, in a golf ball having at least one intermediate layer interposed between a core and a cover, by using as the cover material a rubber composition which includes (a) a diene rubber, (b) methacrylic acid, (c) a metal oxide and (d) an organic peroxide, designing the cover so as to have a Poisson's ratio of at least 0.49, a Shore D hardness of not more than 45 and a thickness of not more than 0.6 mm, and designing the intermediate layer so that at least one layer thereof has a Shore D hardness of at least 60 and a thickness of not more than 2.0 mm, a lower spin rate can be achieved on shots with a driver (W #1), resulting in an excellent flight performance, in addition to which the controllability in the short game can be improved.

Accordingly, the invention provides a golf ball having a core, a cover, and at least one intermediate layer interposed therebetween, wherein the cover is formed of a rubber composition which includes: (a) a diene rubber, (b) methacrylic acid, (c) a metal oxide and (d) an organic peroxide. The cover has a Poisson's ratio of at least 0.49, a Shore D hardness of not more than 45 and a thickness of not more than 0.6 mm. At least one intermediate layer has a Shore D hardness of at least 60 and a thickness of not more than 2.0 mm.

In a preferred embodiment of the golf ball of the invention, the diene rubber of component (a) includes a styrene-butadiene rubber (SBR) and/or an isoprene rubber (IR), these ingredients accounting for between 30 and 70 wt % of the total amount of diene rubber serving as component (a).

In another preferred embodiment of the inventive golf ball, in a dynamic viscoelasticity test on vulcanized rubber obtained from the rubber composition containing components (a) to (d), the loss tangent (tan δ) at an initial strain of 0.1 N, an amplitude of 1%, a frequency of 15 Hz and a temperature of −10° C. is at least 0.20.

In yet another preferred embodiment, at least one intermediate layer is formed of a resin material having a melting point of at least 100° C. In this embodiment, the resin material may include, based on the total amount thereof, at least 50 wt % of a synthetic rubber.

Advantageous Effects of the Invention

The golf ball of the present invention, even with the use of a rubber cover, compares favorably with balls having conventional resin covers, both in that it can achieve a lower spin rate on shots with a driver (W #1) and thus has an excellent flight performance and also in that it can improve controllability in the short game.

DESCRIPTION OF THE PREFERRED EMBODIMENTS

The objects, features and advantages of the invention will become more apparent from the following detailed description taken in conjunction with the appended diagram.

The golf ball of the invention is a multi-piece solid golf ball having a construction of three or more layers that includes, in order from the interior: a core, an intermediate layer and a cover.

In the invention, a rubber composition that includes (a) a diene rubber, (b) methacrylic acid, (c) a metal oxide and (d) an organic peroxide is used as the material making up the cover. These ingredients are described in detail below.

(a) Diene Rubber

The diene rubber serving as component (a) is exemplified by polybutadiene rubber, styrene-butadiene rubber (SBR), polyisoprene rubber (IR), styrene-isoprene copolymers, butyl rubber, chloroprene rubber, isobutylene-isoprene rubber and acrylonitrile-butadiene rubber. In this invention, preferred use can be made of polybutadiene rubber, styrene-butadiene rubber (SBR) and polyisoprene rubber (IR).

When polybutadiene is used as component (a), the polybutadiene has a cis-1,4-bond content of at least 60% (here and below, "%" signifies percent by weight), preferably at least 80%, more preferably at least 90%/o, and most preferably at least 95%. When the cis-1,4-bond content is too low, the rebound decreases. The 1,2-vinyl bond content is preferably not more than 2%, more preferably not more than 1.7%, and even more preferably not more than 1.5%.

The polybutadiene has a Mooney viscosity ($ML_{1+4}$ (100° C.)) of preferably at least 30, and more preferably at least 35. The upper limit is preferably not more than 100, and more preferably not more than 90.

A specific example of the polybutadiene is cis-1,4-polybutadiene rubber. Use can be made of, for example, the high-cis products BR01, BR11, BR02, BR02L, BR02LL, BR730 and BR51, all from JSR Corporation.

Styrene-butadiene rubber (SBR) is exemplified by solution-polymerized styrene-butadiene rubbers and emulsion-polymerized styrene-butadiene rubbers. Specific examples of solution-polymerized styrene-butadiene rubbers that may be used include the solution-polymerized products SBR-SL552, SL555, and SL563, all from JSR Corporation. Specific examples of emulsion-polymerized styrene-butadiene rubbers that may be used include the emulsion-polymerized products SBR1500, 1502, 1507 and 0202, all from JSR Corporation. The styrene bond content in typical commercially available solution-polymerized styrene-butadiene rubbers is from 5 to 50%. The styrene bond content in such emulsion-polymerized styrene-butadiene rubbers is from 15 to 50%.

Polyisoprene rubbers (IR) that may be used are ones having a cis-1,4-bond content of at least 60%, preferably at least 80%, and more preferably at least 90%, and having a Mooney viscosity ($ML_{1+4}$ (100° C.)) of at least 70, preferably at least 75, and more preferably at least 80, but not more than 90, and preferably not more than 85. Specifically, use can be made of, for example, IR220 from JSR Corporation.

The diene rubber serving as component (a) preferably includes the above-mentioned styrene-butadiene rubber (SBR) and/or the above-mentioned isoprene rubber (IR). From the standpoint of holding down the ball rebound and improving the spin performance, the content of these ingredients per 100 wt % for the total amount of component (a) is preferably from 30 to 70 wt %.

(b) Methacrylic Acid

Methacrylic acid is used as an essential ingredient in this invention. By including methacrylic acid, a rubber material that is tough and has an excellent wear resistance can be obtained. Component (b) does not include metal salts of methacrylic acid, such as zinc methacrylate.

The methacrylic acid content per 100 parts by weight of the above diene rubber is preferably at least 5 parts by weight, more preferably at least 10 parts by weight, and even more preferably at least 13 parts by weight. The upper limit in this content is preferably not more than 40 parts by weight, more preferably not more than 35 parts by weight, and even more preferably not more than 30 parts by weight. At too high a content, the scuff resistance may decrease. On the other hand, at too low a content, a sufficient hardness and resilience may not be obtained.

An ordinary reagent may be used as component (b). For example, reagents available from Fujifilm Wako Pure Chemical Corporation and Junsei Chemical Co., Ltd. may be used.

(c) Metal Oxide

The metal oxide serving as component (c) is exemplified by zinc oxide, magnesium oxide and calcium oxide. From the standpoint of durability, the use of zinc oxide is preferred.

The content of this metal oxide per 100 parts by weight of the diene rubber is preferably at least 5 parts by weight, more preferably at least 10 parts by weight, and even more preferably at least 15 parts by weight. The upper limit is preferably not more than 40 parts by weight, more preferably not more than 35 parts by weight, and even more preferably not more than 30 parts by weight. At too high or too low a content, it may not be possible to obtain a suitable durability and rebound.

(d) Organic Peroxide

The organic peroxide of component (d) triggers cross-linking reactions due to radicals generated by thermal decomposition. Illustrative examples of the organic peroxide include dialkyl peroxides such as dicumyl peroxide, di(2-t-butylperoxyisopropyl)benzene, t-butylcumyl peroxide, di-t-butyl peroxide, 2,5-dimethyl-2,5-di(t-butylperoxy)hexane, di-t-hexyl peroxide and 2,5-dimethyl-2,5-di(t-butylperoxy) hexane-3; peroxyketals such as 1,1-bis(t-butylperoxy)-3,3, 5-trimethylcyclohexane, 1,1-di(t-hexylperoxy)-3,3,5-trimethylcycloexane, 1,1-di(t-hexylperoxy)cyclohexane, 2,2-di (4,4-di(t-butylperoxy)cyclohexyl)propane, n-butyl-4,4-di(t-butylperoxy)valerate and 1,1-di(t-butylperoxy)cyclohexane; diacyl peroxides such as diisobutyryl peroxide, di(3,3,5-trimethylhexanoyl) peroxide, dilauroyl peroxide and disuccinic acid peroxide; peroxy esters such as 1,1,3,3-tetramethylbutylperoxy-2-ethylhexanoate, t-hexylperoxy-2-ethylhexanoate, t-butylperoxy-2-ethylhexanoate, t-butylperoxylaurate and t-butylperoxyacetate; ketone peroxides such as cyclohexanone peroxide and acetylacetone peroxide; hydroperoxides such as p-menthane hydroperoxide and diisopropylbenzene hydroperoxide and peroxydicarbonates such as diisopropyl peroxydicarbonate and di(4-t-butylcyclohexyl) peroxydicarbonate. These organic peroxides may be used singly or two or more may be used in combination.

The organic peroxide may be a commercially available product, specific examples of which include those having the trade names Percumyl D, Perhexa C-40, Perbutyl P, Perbutyl C, Perbutyl D, Perhexa 25B, Perhexyl D, Perhexyne 25B, Perhexa TMH, Perhexa HC, Pertetra A, Perhexa V, Peroyl IB, Peroyl 335, Peroyl L, Peroyl SA, Perbutyl L, Perbutyl A, Perocta O, Perhexyl O, Perbutyl O, Perhexa H, Percure AH, Permentha H, Percumyl P, Peroyl IPP and Peroyl TCP (all available from NOF Corporation), and that having the trade name Trigonox 29-408 (40% concentration product, from Akzo Nobel N.V.).

The amount of organic peroxide included per 100 parts by weight of the diene rubber is preferably at least 0.1 part by weight, more preferably at least 0.3 part by weight, even more preferably at least 0.5 part by weight, and most preferably at least 0.6 part by weight. The upper limit is preferably not more than 5 parts by weight, more preferably not more than 4 parts by weight, even more preferably not more than 3 parts by weight, and most preferably not more than 2.5 parts by weight. When too much or too little is included, it may not be possible to obtain a ball having a good durability and rebound.

In addition, various additives may be optionally included in the rubber composition. For example, inorganic fillers such as barium sulfate and calcium carbonate, various types of antioxidants, and organic sulfur compounds may be suitably included.

The golf ball cover, which is a molded rubber body, can be produced by vulcanizing/curing the rubber composition containing the above ingredients. For example, production may be carried out by kneading the composition using a mixer such as a Banbury mixer or a roll mill, compression molding or injection molding the kneaded composition using a mold, and curing the molded body by suitably heating it at a temperature sufficient for the organic peroxide and the methacrylic acid (which serves as co-crosslinking agent) to act, i.e., from about 100° C. to about 200° C., and preferably from 140 to 180° C., for a period of 3 to 20 minutes.

The vulcanized rubber obtained from the rubber composition containing components (a) to (d), when subjected to a dynamic viscoelasticity test, has a loss tangent (tan δ) at an initial strain of 0.1 N, an amplitude of 1%, a frequency of 15 Hz and a temperature of −10° C., of at least 0.20, and preferably at least 0.25. When this loss tangent (tan δ) is 0.20 or more, in use as a cover, the resilience is low but the frictional force is high, as a result of which a high spin rate can be obtained on approach shots.

The loss tangent (tan δ) refers to a value obtained by dividing the loss modulus by the storage modulus, and is also called the dynamic viscoelasticity. This loss tangent (tan δ) can be measured using a commercial measurement apparatus such as the dynamic mechanical analyzer (DMA) Q-800 available from TA Instruments. The measurement conditions are as follows. The test specimen is set to dimensions of 3 mm (W)×1 mm (T)×20 mm (L) (this length is the length of the portion actually measured, and does not include the portions clamped at both ends of the test piece). The initial strain is set to 0.1 N, the amplitude is set to 1% and the frequency is set to 15 Hz. Measurement is carried out at a temperature rise rate of 3° C./min over a temperature range of from −100° C. to 80° C., and the value obtained at −10° C. is used.

The vulcanized rubber obtained from the rubber composition containing components (a) to (d) preferably has a Poisson's ratio of at least 0.49. The Poisson's ratio is expressed as the ratio of strain in the transverse direction to strain in the longitudinal direction (transverse strain/longitudinal strain) when, in a test of the stress and deformation of a rubber material, the rubber contracts in the transverse direction upon being stretched in the longitudinal direction. Although the Poisson's ratio for rubber generally approaches without limit a value of 0.5, by setting the Poisson's ratio to the above value, the frictional forces of the rubber become larger than those of a urethane material.

In this invention, it is critical for the cover to have a Shore D hardness of not more than 45 and a thickness of not more than 0.6 mm. The reason is that by forming the cover so as to be thin, even when it is soft, the spin rate on shots with a driver can be reduced.

The material hardness of the cover on the Shore D hardness scale may be set to not more than 45, preferably not more than 43, and more preferably not more than 40. The lower limit in the Shore D hardness, although not particularly limited, is preferably at least 20, and more preferably at least 30.

The cover is formed very thinly to a thickness of not more than 0.6 mm, preferably not more than 0.5 mm, and more preferably not more than 0.4 mm. The cover thickness is preferably at least 0.1 mm, more preferably at least 0.3 mm, and even more preferably at least 0.4 mm.

The core used in the golf ball of the invention may be formed using a known rubber material as the base material. A known base rubber such as a natural rubber or a synthetic rubber may be used as the base rubber. More specifically, it is recommended that polybutadiene, especially cis-1,4-polybutadiene having a cis structure content of at least 40%, be chiefly used. If desired, natural rubber, polyisoprene rubber, styrene-butadiene rubber or the like may be used together with the foregoing polybutadiene in the base rubber.

The polybutadiene may be synthesized with a metal catalyst, such as a neodymium or other rare-earth catalyst, a cobalt catalyst or a nickel catalyst.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be included in the base rubber. If necessary, commercial antioxidants and the like may also be suitably added.

The core has a diameter which, although not particularly limited, is preferably at least 20 mm, more preferably at least 25 mm, and even more preferably at least 30 mm. The upper limit is preferably not more than 41 mm, and more preferably not more than 40 mm.

In this invention, at least one intermediate layer is provided between the core and the cover outermost layer. It is critical for at least one intermediate layer to have a Shore D hardness of at least 60 and a thickness of not more than 2.0 mm. The reason is that, even when a soft cover is used, this increases the rotational stiffness, both reducing the spin rate on driver shots and also imparting a good feel on impact.

The material hardness of the intermediate layer on the Shore D hardness scale may be set to at least 60, and preferably at least 65. The upper limit may be set to preferably not more than 70, and more preferably not more than 68.

The thickness of the intermediate layer is set to not more than 2.0 mm, preferably not more than 1.8, and more preferably not more than 1.5 mm. The lower limit is preferably at least 0.8 mm, more preferably at least 1.0 mm, and even more preferably at least 1.2 mm. At an intermediate layer thickness outside of the above range in values, the spin rate-lowering effect on shots with a driver (W #1) may be inadequate, as a result of which a good distance may not be achieved.

It is desirable for at least one intermediate layer to be formed of a resin material having a melting point of at least 100° C. Formation from a resin material having a melting point of at least 150° C. is more preferred. Given that the cover in the present invention is molded/vulcanized from a rubber composition and the vulcanization temperature is typically at least 150° C., the reason for having the melting point of the resin material be at least 150° C. is to prevent the intermediate layer material from melting due to such a high temperature. In addition, for the same reason as that given above, it is preferable to have a synthetic rubber account for at least 50 wt % of the total amount of the resin material in the intermediate layer.

Formation of the intermediate layer may be carried out by a customary method such as a known injection molding process. For example, an intermediate layer-encased sphere can be produced by injecting the intermediate layer material over the core in an injection mold so as to obtain an encased sphere, or by enclosing the core within, as the intermediate layer material, two half-cups that have been pre-molded into hemispherical shapes and then molding under applied heat and pressure.

Numerous dimples of one, two or more types may be formed on the surface of the cover. Also, various types of coatings may be applied to the surface of the cover. Because the coating must be capable of enduring the harsh conditions of golf ball use, a two-part curable urethane coating, especially a non-yellowing urethane coating, is preferred.

EXAMPLES

The following Examples and Comparative Examples are provided to illustrate the invention, and are not intended to limit the scope thereof.

Examples 1 to 4, Comparative Examples 1 to 7

As shown in Table 1 below, a solid core of a given diameter was produced in each Example by using the rubber composition described below, which was common to all the Examples, and vulcanizing at 155° C. for 15 minutes.

The solid core-forming rubber composition contained polybutadiene (available under the trade name "BR01" from JSR Corporation) as the base rubber and included also the following per 100 parts by weight of this base rubber: suitable amounts of zinc acrylate (Nippon Shokubai Co., Ltd.) and zinc oxide (Sakai Chemical Co., Ltd.), 1.0 part by weight of dicumyl peroxide (available under the trade name "Percumyl D" from NOF Corporation) as the organic peroxide, and 0.1 part by weight of the antioxidant available under the trade name "Nocrac NS6" (Ouchi Shinko Chemical Industry Co., Ltd.). The amount of zinc oxide included was adjusted so as to result in a ball weight of 45.4 g. The amount of zinc acrylate included was adjusted so as to result in a ball deformation (when compressed under a final load of 1,275 N from an initial load of 98 N) of 2.5 mm.

Formation of Intermediate Layer and Cover

Next, the intermediate layer-forming resin composition shown in Table 1 below was injected-molded so as to peripherally encase the core of a given diameter obtained as described above, thereby producing a sphere encased by an intermediate layer of a given thickness in each Example (intermediate layer-encased sphere). Next, the cover (outermost layer)-forming material shown in Table 1 was injected-molded so as to peripherally encase the intermediate layer-encased sphere, thereby producing a sphere encased by a cover of a given thickness in each Example, which sphere is the ball itself (a three-piece golf ball having a diameter of 42.7 mm). At this time, a common set of dimples was formed on the ball surface in each Example and Comparative Example.

Material Hardnesses (Shore D Hardnesses) of Intermediate Layer and Cover

The resin material for each layer was molded into sheets having a thickness of 2 mm and left to stand for two weeks, following which the Shore D hardness was measured in general accordance with ASTM D2240.

Hytrel 4001: A polyester elastomer available from DuPont-Toray Co., Ltd.

Polyethylene wax: Available under the trade name "Sanwax 161 P" from Sanyo Chemical Industries, Ltd.

Isocyanate compound: 4,4'-Diphenylmethane diisocyanate

Titanium oxide: Tipaque R680, available from Ishihara Sangyo Kaisha, Ltd.

Polybutadiene rubber: Available under the trade name "BR01" from JSR Corporation Styrene-butadiene rubber (SBR):
  Available under the trade name "SBR1507" from JSR Corporation Methacrylic acid: Available from EVONIK Zinc oxide: Available under the trade name "Zinc Oxide Grade 3" from Sakai Chemical Co., Ltd.

Organic peroxide (1): Dicumyl peroxide available under the trade name "Percumyl D" from NOF Corporation Organic peroxide (2): A mixture of 1,1-di(t-butylperoxy)cyclohexane and silica available under the trade name "Perhexa C-40" from NOF Corporation Antioxidant: Nocrac NS-6, from Ouchi Shinko Chemical Industry Co., Ltd.

The cover materials were molded into sheets, and (1) the Poisson's ratio and (2) the loss tangent (tan δ) for each were determined.

(1) Measurement of Poisson's Ratio

The Poisson's ratio was determined in accordance with JIS K7161 by stretching a tensile test specimen and carrying out measurement with strain gauges.

Measurement was carried out with the tension/compression testing machine available from A&D Company, Ltd. under the product name Tensilon RTG-1310. The measurement conditions were as follows. The test specimen had dimensions of 3 mm (W)×1 mm (T)×20 mm (L) (this length

TABLE 1

| Intermediate layer/Cover material (pbw) | | (1) | (2) | (3) | (4) | (5) | (6) | (7) | (8) |
|---|---|---|---|---|---|---|---|---|---|
| Himilan 1706 | | 35 | | | | | | | |
| Himilan 1557 | | 15 | | | | | | | 30 |
| Himilan 1605 | | 50 | | | | | | | |
| Himilan 1855 | | | | | | | | 20 | |
| AM7331 | | | | | | | | | 50 |
| T-8260 | | | | 100 | | | | | |
| T-8283 | | | | | | | | 100 | |
| Hytrel 4001 | | | | | 11 | | | | |
| Silicone wax | | | | | | | | 0.5 | |
| Polyethylene wax | | | | | 1.0 | | | 1.0 | |
| Isocyanate compound | | | | | 7.5 | | | 6.3 | |
| Titanium oxide | | | | | 3.0 | | | 3.3 | 2.2 |
| Trimethylolpropane (TMP) | | 1.1 | | | | | | | |
| Polybutadiene rubber | Ingredients of the invention | Component (a) | 100 | | | 70 | 50 | 70 | | |
| Styrene-butadiene rubber (SBR) | | Component (a) | | | | 30 | 50 | 30 | | |
| Methacrylic acid | | Component (b) | 27.5 | | | 20 | 17 | 20 | | |
| Zinc oxide | | Component (c) | 23.5 | | | 25 | 25 | 25 | | |
| Organic peroxide (1) | | Component (d) | 2.0 | | | | | | | |
| Organic peroxide (2) | | Component (d) | | | | 2.0 | 7.0 | 4.0 | | |
| | | Antioxidant | 0.2 | | | 0.2 | 0.2 | 0.2 | | |
| | | melting point (° C.) | 91 | | 160 | | | | | |

Details on the above intermediate layer and cover materials are given below.

Himilan, AM7331: Ionomers available from DuPont-Mitsui Polychemicals Co., Ltd.

T-8260, T-8283: MDI-PTMG-type thermoplastic polyurethanes available under the trade name Pandex from DIC Covestro Polymer, Ltd.

being the length of the portion actually measured and not including the portions clamped at either end of the test piece), and measurement was carried out in the tension mode (velocity, 0.005 mm/min) and at a temperature of 23° C. Two mutually perpendicular strain gauges were attached to the center of the test specimen and the longitudinal strain and transverse strain were measured, from which the Poisson's ratio was determined.

(2) Measurement of Loss Tangent (Tan δ)

The loss tangent (tan δ) was measured with a dynamic mechanical analyzer (DMA) from TA Instruments (Q-800). The measurement conditions were as follows. The test specimen was set to dimensions of 3 mm (W)×1 mm (T)×20 mm (L) (this length being the length of the portion actually measured and not including the portions clamped at either end of the test piece). The initial strain was set to 0.1 N, the amplitude was set to 1% and the frequency was set to 15 Hz. Measurement was carried out at a temperature rise rate of 3° C./min over a temperature range of from −100° C. to 80° C., and the value at −10° C. was used.

The golf balls obtained in the respective Examples and Comparative Examples were evaluated as follows for spin performance. The results are shown in Table 2.

Spin Rate on Shots with a Driver

A driver was mounted on a golf swing robot and the spin rate of the ball when struck at a head speed of 45 m/was measured. The club used was the TourB XD-5 Driver (loft angle, 9.5°) manufactured by Bridgestone Sports Co., Ltd.

Spin Rate on Approach Shots

A sand wedge (SW) was mounted on a golf swing robot and the spin rate of the ball when struck at a head speed of 20 m/s was measured. The club used was the TourB XW-1 SW manufactured by Bridgestone Sports Co., Ltd.

Japanese Patent Application No. 2018-245206 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core, a cover, and at least one intermediate layer interposed therebetween, wherein the cover is formed of a rubber composition consisting of:
   (a) cis-1,4-polybutadiene rubber and one or more diene rubbers selected from the group consisting of styrene-butadiene rubber (SBR) and cis-1,4-polyisoprene rubber (IR),
   (b) methacrylic acid,
   (c) a metal oxide,
   (d) an organic peroxide, and
   (e) one or more additives selected from the group consisting of an inorganic filler, an antioxidant, and an organic sulfur compound;
   the cover has a Poisson's ratio of at least 0.49, a Shore D hardness of not more than 45 and a thickness of not more than 0.6 mm; and at least one intermediate layer

TABLE 2

|  |  | Example | | | | Comparative Example | | | | |
| --- | --- | --- | --- | --- | --- | --- | --- | --- | --- | --- |
|  |  | 1 | 2 | 3 | 4 | 1 | 2 | 3 | 4 | 5 |
| Core | Diameter (mm) | 38.9 | 39.3 | 39.3 | 39.3 | 38.4 | 37.6 | 38.4 | 39.3 | 38.9 |
| Intermediate layer | Formulation | (1) | (1) | (2) | (3) | (1) | (1) | (1) | (1) | (1) |
|  | Diameter (mm) | 41.5 | 41.9 | 41.9 | 41.9 | 41.0 | 40.20 | 41.0 | 41.0 | 41.5 |
|  | Thickness (mm) | 1.3 | 1.3 | 1.3 | 1.3 | 1.3 | 1.3 | 1.3 | 0.85 | 1.3 |
|  | Hardness (Shore D) | 62 | 62 | 60 | 61 | 62 | 62 | 62 | 62 | 62 |
| Cover | Formulation | (4) | (5) | (5) | (5) | (7) | (8) | (4) | (5) | (6) |
|  | Thickness (mm) | 0.6 | 0.4 | 0.4 | 0.4 | 0.85 | 1.25 | 0.85 | 0.85 | 0.6 |
|  | Hardness (Shore D) | 42 | 35 | 35 | 35 | 40 | 53 | 42 | 35 | 48 |
|  | Poisson's ratio | 0.492 | 0.496 | 0.496 | 0.496 | 0.430 | 0.470 | 0.492 | 0.496 | 0.491 |
|  | tan δ | 0.22 | 0.26 | 0.26 | 0.26 | 0.20 | 0.12 | 0.22 | 0.26 | 0.24 |
| Ball Performance | Spin on driver shots (rpm) | 2,740 | 2,720 | 2,750 | 2,740 | 2,830 | 2,810 | 2,860 | 2,910 | 2,720 |
|  | Spin on approach shots (rpm) | 6,450 | 6,480 | 6,530 | 6,510 | 6,320 | 5,940 | 6,470 | 6,520 | 5,960 |

As shown in Table 2 above, the golf balls in Examples 1 to 4 according to the present invention had small spin rates on driver shots and high spin rates on approach shots.

By contrast, the golf ball obtained in Comparative Example 1 was constructed with a urethane cover and the cover had a large thickness. As a result, the spin rate on shots with a driver (W #1) was high.

The golf ball in Comparative Example 2 was constructed with an ionomer cover and the cover hardness was high. As a result, the spin rate on approach shots was low.

The golf ball in Comparative Example 3 had a thickly formed cover, and so the spin rate on shots with a driver (W #1) was high.

The golf ball in Comparative Example 4 had a thickly formed cover, and so the spin rate on shots with a driver (W #1) was high.

The golf ball in Comparative Example 5 had a thick cover, and so the spin rate on approach shots was low.

has a Shore D hardness of at least 60 and a thickness of not more than 2.0 mm, and wherein the diene rubbers account for between 30 and 70 wt % of the total amount of component (a).

2. The golf ball of claim 1 wherein, in a dynamic viscoelasticity test on vulcanized rubber obtained from the rubber composition containing components (a) to (e), the loss tangent (tan δ) at an initial strain of 0.1 N, an amplitude of 1%, a frequency of 15 Hz and a temperature of −10° C. is at least 0.20.

3. The golf ball of claim 1, wherein at least one intermediate layer is formed of a resin material having a melting point of at least 100° C.

4. The golf ball of claim 3, wherein the resin material includes, based on the total amount thereof, at least 50 wt % of a synthetic rubber.

5. The golf ball of claim 1, wherein the diene rubbers account for between 30 and 50 wt % of the total amount of component (a).

6. The golf ball of claim 1, wherein the material hardness of the cover on the Shore D hardness scale is from 20 to 35.

\* \* \* \* \*